United States Patent
Wibowo et al.

(10) Patent No.: US 10,008,918 B2
(45) Date of Patent: Jun. 26, 2018

(54) PHASE-SHIFTING OPTIMIZATION FOR ASYMMETRIC INDUCTORS IN MULTI-PHASE DC-DC CONVERTERS

(71) Applicant: Dialog Semiconductor (UK) Limited, London (GB)

(72) Inventors: Santhos Ario Wibowo, Kanagawa (JP); Hidenori Kobayashi, Kanagawa (JP); Seiichi Ozawa, Saitama (JP); Hidechika Yokoyama, Tokyo (JP)

(73) Assignee: Dialog Semiconductor (UK) Limited, London (GB)

( * ) Notice: Subject to any disclaimer, the term of this patent is extended or adjusted under 35 U.S.C. 154(b) by 3 days.

(21) Appl. No.: 15/333,230

(22) Filed: Oct. 25, 2016

(65) Prior Publication Data
US 2018/0115236 A1 Apr. 26, 2018

(51) Int. Cl.
*H02M 1/084* (2006.01)
*H02M 3/158* (2006.01)
*H02M 1/14* (2006.01)

(52) U.S. Cl.
CPC ............ *H02M 1/084* (2013.01); *H02M 1/14* (2013.01); *H02M 3/158* (2013.01)

(58) Field of Classification Search
CPC ......... H02M 1/084; H02M 1/14; H02M 3/158
USPC ....................................... 323/217
See application file for complete search history.

(56) References Cited

U.S. PATENT DOCUMENTS

| | | | | |
|---|---|---|---|---|
| 6,320,480 | B1 * | 11/2001 | Kintis | ............... H01P 1/18 333/156 |
| 6,628,106 | B1 * | 9/2003 | Batarseh | ............. H02M 3/1584 323/222 |
| 6,995,548 | B2 * | 2/2006 | Walters | ............... H02M 3/1584 323/272 |

(Continued)

FOREIGN PATENT DOCUMENTS

CH 701 759 3/2011

OTHER PUBLICATIONS

Received STIC search report from EIC 2800 searcher John DiGeronimo dated Apr. 10. 2017.*

(Continued)

*Primary Examiner* — Timothy J Dole
*Assistant Examiner* — Htet Z Kyaw
(74) *Attorney, Agent, or Firm* — Saile Ackerman LLC; Stephen B. Ackerman (57) ABSTRACT

A system is disclosed which provides the minimization of peak-to-peak output voltage ripple in multi-phase DC-DC switching converters, with two or more different value inductors (asymmetric inductors), by the optimization of phase-shifting determined by the inductance on each phase. An object of the disclosure is to ensure both the AC accuracy of the output voltage and the efficiency of the DC-DC switching converter is increased. The output voltage ripple improvement is shown to be dependent on the duty-cycle. Another object of the disclosure is to minimize the total inductor current ripple and improving the efficiency of the DC-DC switching converter by reducing the capacitor loss. Still another object of the disclosure is to minimize the output voltage ripple in the multi-phase DC-DC switching converter by ensuring the sum of the inductor current vectors is equal to zero.

16 Claims, 9 Drawing Sheets

(56) References Cited

U.S. PATENT DOCUMENTS

| | | | |
|---|---|---|---|
| 7,075,346 B1* | 7/2006 | Hariman | H02M 3/285 327/116 |
| 7,449,867 B2* | 11/2008 | Wu | H02M 3/1584 323/247 |
| 8,063,617 B2* | 11/2011 | Wang | H02M 3/1584 323/272 |
| 8,368,371 B2* | 2/2013 | Zafarana | H02M 3/1584 323/282 |
| 8,896,280 B2* | 11/2014 | Tang | H02M 3/1584 323/269 |
| 2004/0041543 A1* | 3/2004 | Brooks | H02M 3/1584 323/212 |
| 2004/0080962 A1* | 4/2004 | Charych | H02M 3/33515 363/21.11 |
| 2004/0123167 A1 | 6/2004 | Chapuis | |
| 2004/0158759 A1* | 8/2004 | Chang | G06F 1/06 713/500 |
| 2005/0093525 A1* | 5/2005 | Walters | H02M 3/1584 323/272 |
| 2005/0110472 A1 | 5/2005 | Harris et al. | |
| 2006/0043943 A1* | 3/2006 | Huang | H02M 3/1584 323/222 |
| 2006/0055389 A1* | 3/2006 | Rice | H02M 3/156 323/288 |
| 2006/0125451 A1* | 6/2006 | Tabaian | H02M 1/08 323/222 |
| 2006/0158163 A1* | 7/2006 | Machesney | H02M 3/1584 323/246 |
| 2006/0193417 A1* | 8/2006 | Jamison | G06F 1/12 375/376 |
| 2008/0205098 A1 | 8/2008 | Xu et al. | |
| 2008/0265857 A1* | 10/2008 | Tabaian | H02M 1/08 323/288 |
| 2010/0120389 A1* | 5/2010 | Blum | H03L 7/07 455/208 |
| 2010/0194369 A1* | 8/2010 | Nagai | H02M 3/156 323/284 |
| 2011/0025284 A1* | 2/2011 | Xu | H02M 3/1584 323/282 |
| 2011/0043181 A1* | 2/2011 | Jing | H02M 3/158 323/288 |
| 2011/0062930 A1* | 3/2011 | Houston | H02M 3/1584 323/284 |
| 2011/0101938 A1* | 5/2011 | Ma | H02M 3/07 323/282 |
| 2011/0286144 A1* | 11/2011 | Ikriannikov | H01F 17/04 361/268 |
| 2012/0062207 A1* | 3/2012 | Ikriannikov | H01F 38/08 323/361 |
| 2013/0214751 A1 | 8/2013 | Shiraishi et al. | |
| 2014/0062433 A1* | 3/2014 | Zhou | H02M 3/158 323/271 |
| 2015/0002115 A1* | 1/2015 | Shenoy | H02M 3/1584 323/271 |
| 2015/0097542 A1* | 4/2015 | Repton | H02M 3/1584 323/282 |
| 2016/0006336 A1* | 1/2016 | Bennett | H02M 1/00 323/271 |

OTHER PUBLICATIONS

German Office Action, Reference No. 10 2016 223 986.4, Applicant: Dialog Semiconductor (UK) Limited, dated Jun. 6, 2017, 5 pgs., and English language translation, 6 pgs.

* cited by examiner

PHASE-SHIFTING OPTIMIZATION FOR ASYMMETRIC INDUCTORS IN MULTI-PHASE DC-DC CONVERTERS

BACKGROUND

Field

The disclosure relates generally to phase shifting in a DC-DC switching converter.

Description of Related Art

Asymmetric inductor configuration is known to optimize the efficiency performance of a multi-phase DC-DC switching converter over a wide range of load currents. Phase interleaving methods are commonly used to minimize the output voltage ripple. 180 degree phase-shifting, 120 degree phase-shifting, and 90 degree phase-shifting are used in 2-phase, 3-phase, and 4-phase DC-DC switching converters.

However, these phase-shifting configurations might not be the optimum configuration if asymmetric inductors are used in a multi-phase DC-DC switching converter design. Different value inductors will generate different amplitudes of current ripple. When the amplitudes of the current ripple in each phase are different, the 360 deg/number-of-phase method may not be the optimum configuration to achieve the smallest output voltage ripple.

SUMMARY

An object of the disclosure is to minimize the peak-to-peak output voltage ripple in a multi-phase DC-DC switching converter, with two or more different inductor values (asymmetric inductors), by optimum phase-shift configuration determined by the inductance on each phase.

Further, another object of this disclosure is to ensure that the AC accuracy of the output voltage and the efficiency of the DC-DC switching converter is increased. The output voltage ripple improvement is shown to be dependent on the duty-cycle.

Still, another object of this disclosure is to minimize the total inductor current ripple and improving the efficiency of the DC-DC switching converter by reducing the capacitor loss.

Still, another object of this disclosure is to minimize the output voltage ripple in the multi-phase DC-DC switching converter by ensuring the sum of the inductor current vectors is equal to zero.

To accomplish the above and other objects, an n-phase buck converter is disclosed, comprised of n phases, configured with a pair of power switches on each phase. Each pair of power switches is connected to an inductor. The n asymmetric inductors are configured in parallel, and are connected to a single output. A feedback signal taken from the output is compared to a reference voltage by an error amplifier. Output of the error amplifier is compared to ramp signals, resulting in PWM pulses. The PWM pulses are used as drive signals to the n power switches. The drive signals for the power switches of each phase are phase-shifted by the clock generator. The clock generator is configured to optimize the phase-shifting configuration.

The above and other objects are further achieved by a method for phase shift optimization using asymmetric inductors in a multiphase DC-DC switching converter. The steps include providing a multiphase DC-DC switching converter. Adjusting the phase-shift configuration based on the inductance values is provided. Minimizing the output voltage ripple in the multi-phase DC-DC switching converter by ensuring the sum of the inductor current vectors is equal to zero.

In various embodiments the function may be achieved by implementing a Buck, Boost, or Buck-Boost DC-DC switching converter.

In various embodiments the function may be achieved by implementing phase shifting using a synchronous logic circuit.

In various embodiments, the function may be achieved by implementing phase shifting using a clock divider and delay lines. Length of the delay line for each phase is configured based on the optimum phase-shifting configuration.

In various embodiments, the function may be achieved by implementing phase shifting using a ring oscillator with variable delays. The delays are configured based on the optimum phase-shifting configuration.

In various embodiments, the function may be achieved by implementing phase shifting using a delay-locked loop (DLL). The DLL is used to produce variable delays for each phase drive signal. The delays are configured based on the optimum phase-shifting configuration.

DETAILED DESCRIPTION

The accuracy of the output voltage of a DC-DC switching converter, for Buck, Boost, or Buck-Boost types, consists of a DC and an AC level. The present disclosure provides for improving the AC accuracy of the output voltage by minimizing the output voltage ripple. The disclosure also provides for minimizing the total inductor current ripple by reducing the capacitor loss, improving overall efficiency.

The capacitor loss can be calculated by the equation:

$$PCAP = ICAP(RMS)^2 \times ESR$$

where ICAP(RMS) is the RMS value of the AC current flowing through the capacitor. The capacitor current equals the total inductor current ripple, and minimizing the total inductor current ripple will reduce the capacitor loss, and improve overall efficiency.

In the disclosure, a multi-phase DC-DC switching converter, with asymmetric inductors, is designed with optimum phase-shifting configuration. A common multi-phase DC-DC switching converter may adopt a 360 deg/number-of-phases phase-shifting technique to reduce the output voltage ripple magnitude. However, this is not an optimum way to minimize the output voltage ripple. The minimum output voltage ripple in a multi-phase DC-DC switching converter can be achieved when the sum of the inductor current vectors is equal to zero, described by equation below, where the letter n represents the number of phases.

$$\vec{IL}_{ph(1)} + \vec{IL}_{ph(2)} + \vec{IL}_{ph(3)} + \ldots + \vec{IL}_{ph(n-1)} + \vec{IL}_{ph(n)} = 0$$

A key feature of the disclosure is that the direction of the inductor current vectors must add up to a factor of 360 degrees.

Figure 1:
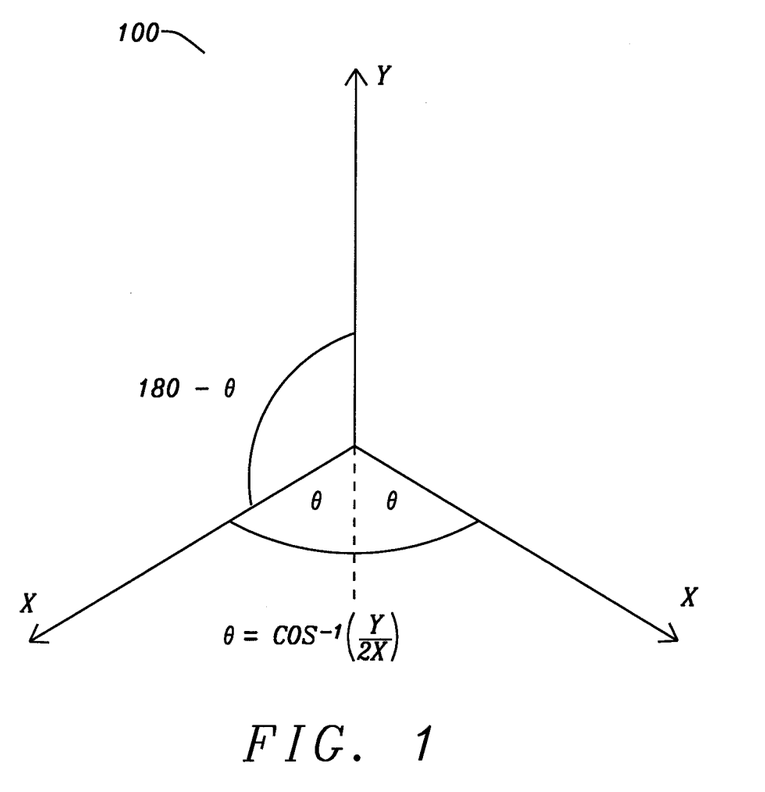
FIG. 1 illustrates phase shifting in a 3-phase DC-DC switching converter.

FIG. 1 illustrates phase shifting 100 in a 3-phase DC-DC switching converter. It shows an example of how to derive the optimum phase-shifting for a 3-phase DC-DC switching converter with inductance on phase-1 larger than the other phases. Y is the amplitude of the current ripple on phase-1, and X is the amplitude of the current ripple on the other phases. The amplitude of the current ripple is known to be inversely proportional to the value of the inductance. Higher inductance translates to a smaller current ripple and lower inductance translates to a larger current ripple.

The smallest output voltage ripple is determined when Y equals 2X COS θ. For example, assuming that Y is half of X, θ is equal to 75.5 deg. Phase-shifting from phase-1 to phase-2 is set to 104.5 deg(180-θ), and phase-shifting from phase-2 to phase-3 is set to 151 deg(2θ). This achieves the minimum output voltage ripple, and is for a 0 deg/104.5 deg/255.5 deg phase-shifting configuration. If Y equals half of X for a 3-phase DC-DC switching converter, a 120 degree phase-shifting configuration determines a larger output voltage ripple.

Figure 2:
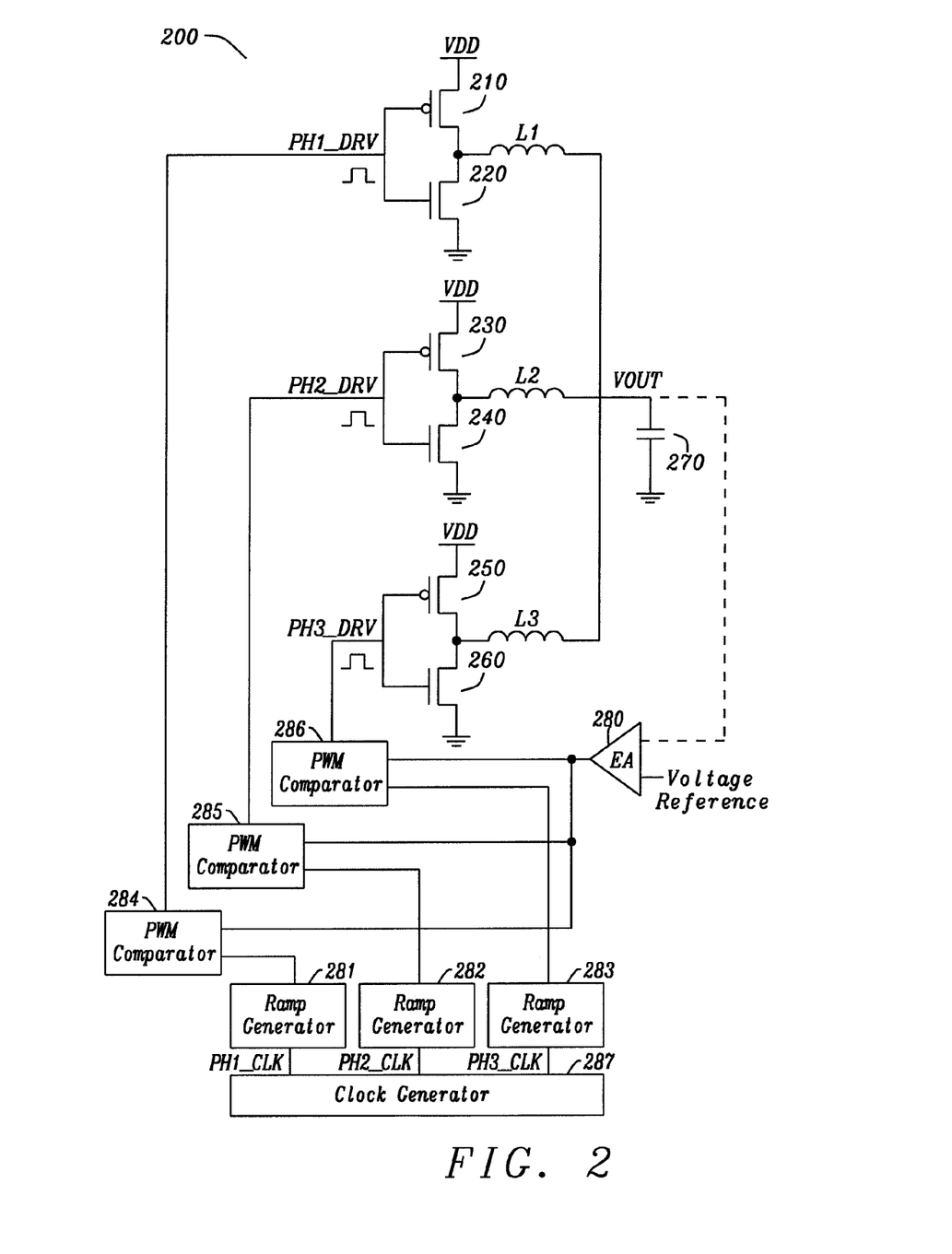
FIG. 2 shows a block diagram of a 3-phase DC-DC switching converter.

FIG. 2 shows block diagram 200 of a 3-phase DC-DC switching converter. There are three phases with a pair of power switches on each phase. PH1_DRV drives power switches 210 and 220, connected to inductor L1. PH2_DRV drives power switches 230 and 240, connected to inductor L2. PH3_DRV drives power switches 250 and 260, connected to inductor L3. The three inductors in parallel are connected to a single output VOUT across capacitor 270. The feedback signal taken from the output is compared to a voltage reference in error amplifier EA 280. The output of the error amplifier is compared to ramp signals from the ramp generators, 281, 282, and 283, by the PWM comparators, 284, 285, and 286, resulting in PWM pulses. The PWM pulses are used as drive signals PH1_DRV, PH2_DRV, and PH3_DRV for the power switches.

The PWM comparators, 284, 285, and 286, are used to compare the output of the error amplifier and the ramp signal. The clock generator 287 generates phase-shifted clocks for the ramp generators, 281, 282, and 283. The phase-shifted clocks generated by the clock generator will determine the phase-shifting configuration in multi-phase DC-DC switching converter.

Figure 3:
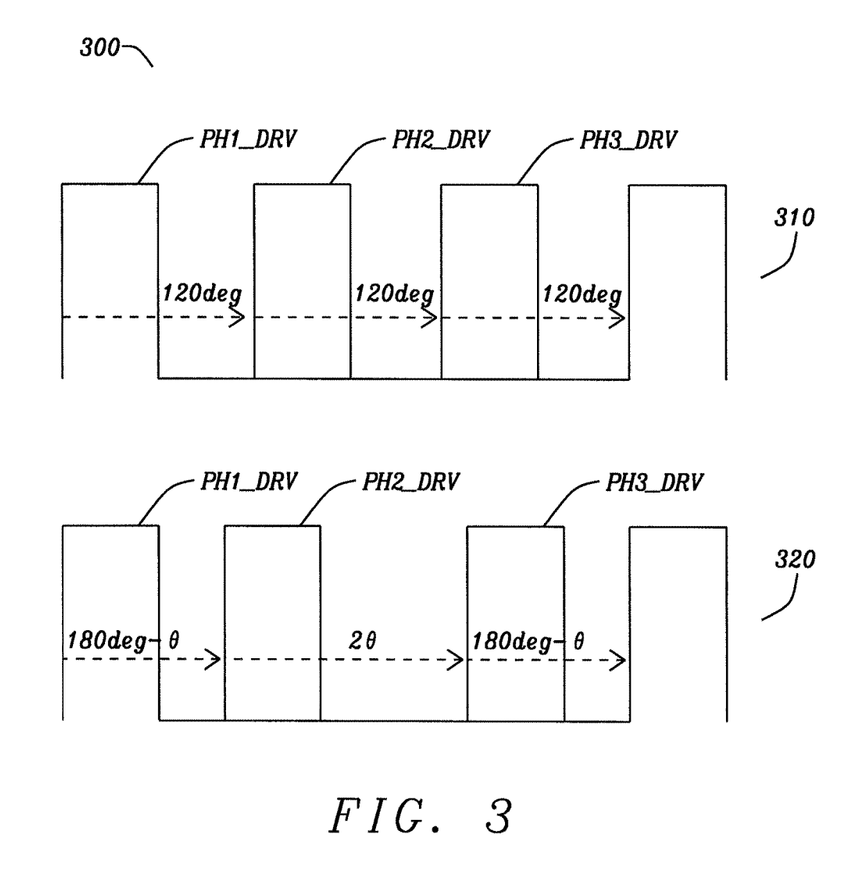
FIG. 3 illustrates drive signal timing diagrams of the prior art, compared to the principles of the disclosure, in a 3-phase DC-DC switching converter.

FIG. 3 illustrates drive signal timing diagrams 300, of the prior art compared to the principles of the disclosure, in a 3-phase DC-DC switching converter. Prior art timing diagram 310 depicts 120 degrees between signals PH1_DRV, PH2_DRV, and PH3_DRV for its phase-shifting configuration, and is shown to be not the optimum configuration. Timing diagram 320, according to the disclosure, depicts asymmetric inductors configured to create phase-shifting different than 120 degrees between signals. For example, inductance L1 on phase-1 is larger than inductance L2 on phase-2 and inductance L3 on phase-3. In this configuration, the drive signals PH1_DRV, PH2_DRV, and PH3_DRV are shifted between phases according to the inductance values. For example, if L1 is two times larger than L2 and L3, θ will be set to 75.5 deg, derived by equation Y equals 2X COS θ in FIG. 1, to obtain the smallest output voltage ripple.

The clock generator can be configured to optimize the phase-shifting configuration.

Figure 4:
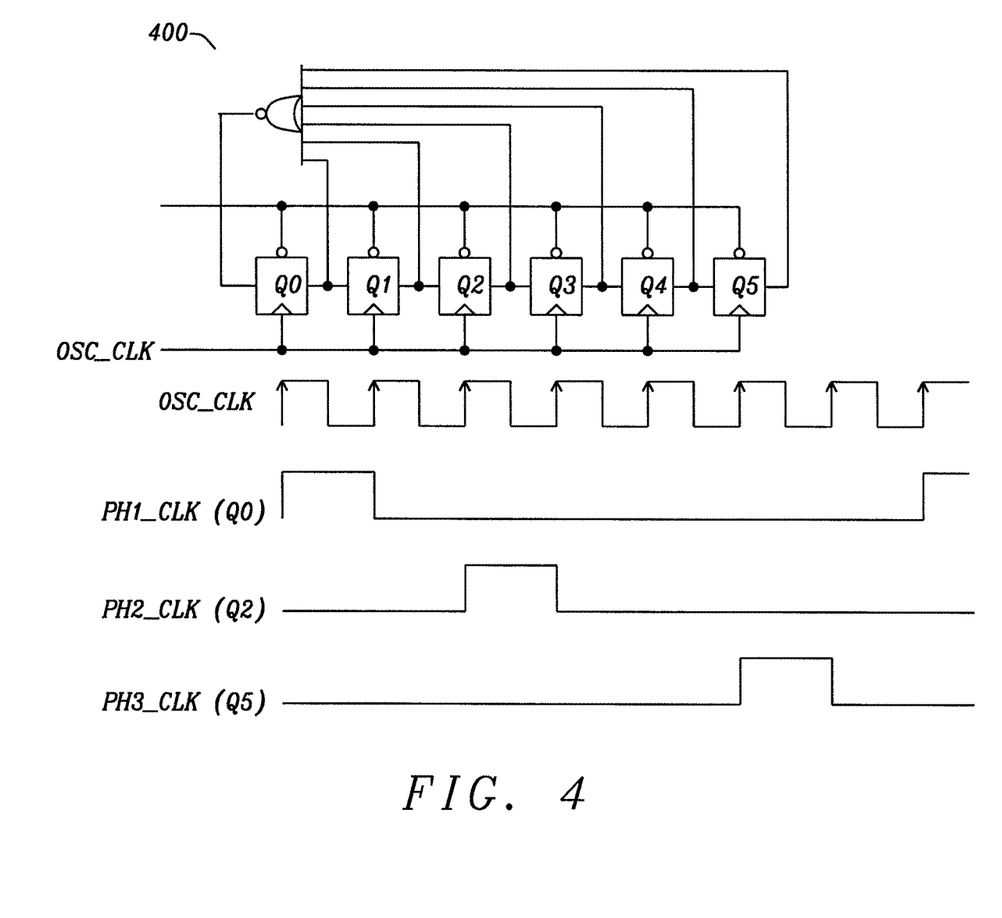
FIG. 4 shows phase shifting using a synchronous logic circuit, embodying the principles of the disclosure.

FIG. 4 shows phase shifting 400, using a synchronous logic circuit, embodying the principles of the disclosure. An example is shown with a synchronous logic circuit to achieve PH1_CLK(Q0), PH2_CLK(Q2), and PH3_CLK (Q5) 0 deg/102.8 deg/257.2 deg phase-shifting configuration. This effectively reduces the peak-to-peak output voltage ripple when inductance on phase-1 is almost two times larger than the other inductor values in a 3-phase switching converter (in industry practice, there is no inductor value that is exactly twice larger, and the common values for inductors are 0.1, 0.15, 0.22, 0.33, 0.47, 0.56, 0.68, etc.). In this implementation, the oscillator clock OSC_CLK has been set 3.5 times higher than the actual DC-DC switching converter frequency.

Figure 5:
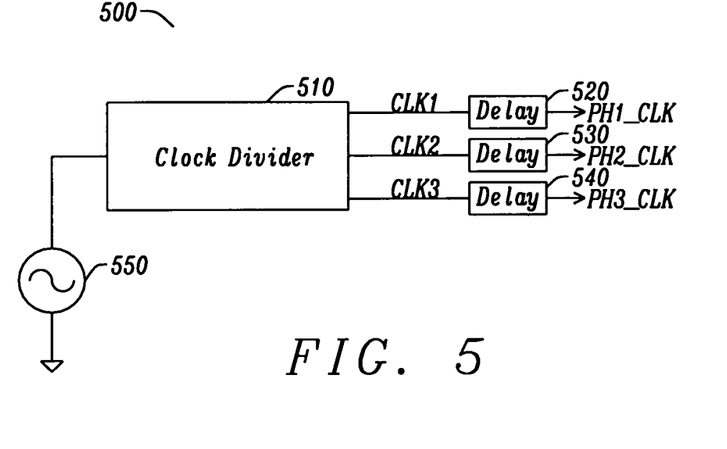
FIG. 5 illustrates another possible phase shifting implementation, using a clock divider and delay line, embodying the principles of the disclosure.

FIG. 5 illustrates another possible phase shifting implementation 500, using clock divider 510 and delay lines 520, 530, and 540, embodying the principles of the disclosure. Length of the delay line for each phase in this architecture can be configured based on the optimum phase-shifting configuration. The delays of the clock signal 550 represent the phase-shifting in a multiphase DC-DC switching converter. For example, in a 3-phase switching converter, the rising edge of the second phase clock, PH2_CLK, would be T*(180-θ)/360 delayed from the rising edge of the first phase clock, PH1_CLK. The rising edge of the third phase clock, PH3_CLK, would be T*2θ/360 delayed from the rising edge of the second phase clock PH2_CLK, and the rising edge of the first phase clock PH1_CLK would be T*(180-θ)/360 delayed from the rising edge of the third phase clock PH3_CLK, where T is the period of the clock and θ is derived by equation Y equals 2X COS θ in FIG. 1. Clock signals CLK1, CLK2, and CLK3, with configured DELAY, are used as the drive signals of the power switches.

Figure 6:
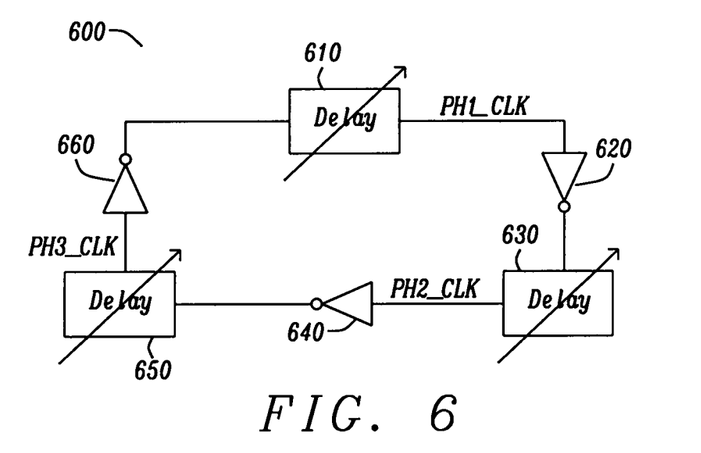
FIG. 6 shows another possible phase shifting implementation, using a ring oscillator with variable delays, embodying the principles of the disclosure.

FIG. 6 shows another possible phase shifting implementation 600, using a ring oscillator with variable delays, embodying the principles of the disclosure. Similar to the implementation shown in FIG. 5, delays in the architecture are configured based on the optimum phase-shifting configuration in order to minimize the peak-to-peak output voltage ripple. Delay 610 configures PH1_CLK through inverter 620, Delay 630 configures PH2_CLK through inverter 640, and Delay 650 configures PH3_CLK through inverter 660.

Figure 7:
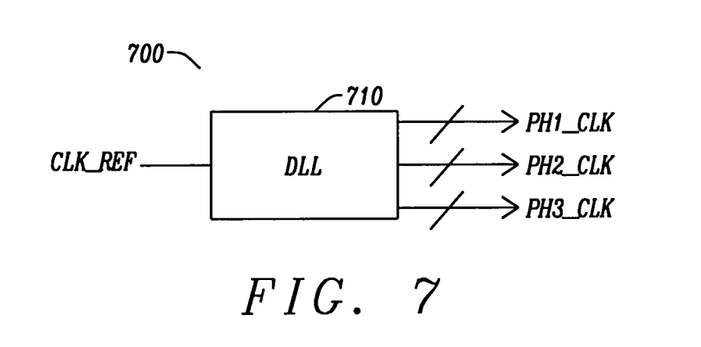
FIG. 7 illustrates another possible phase shifting implementation, using a Delay-locked Loop (DLL), embodying the principles of the disclosure.

FIG. 7 illustrates another possible phase shifting implementation 700, using Delay-locked Loop (DLL) 710, embodying the principles of the disclosure. The delay-locked loop is used to produce variable delays, PH1_CLK, PH2_CLK, and PH3_CLK, for each phase drive signal, from clock reference signal CLK_REF. Similar to the implementation shown in FIG. 5 and FIG. 6, delays in this architecture are configured based on the optimum phase-shifting configuration.

Figure 8:
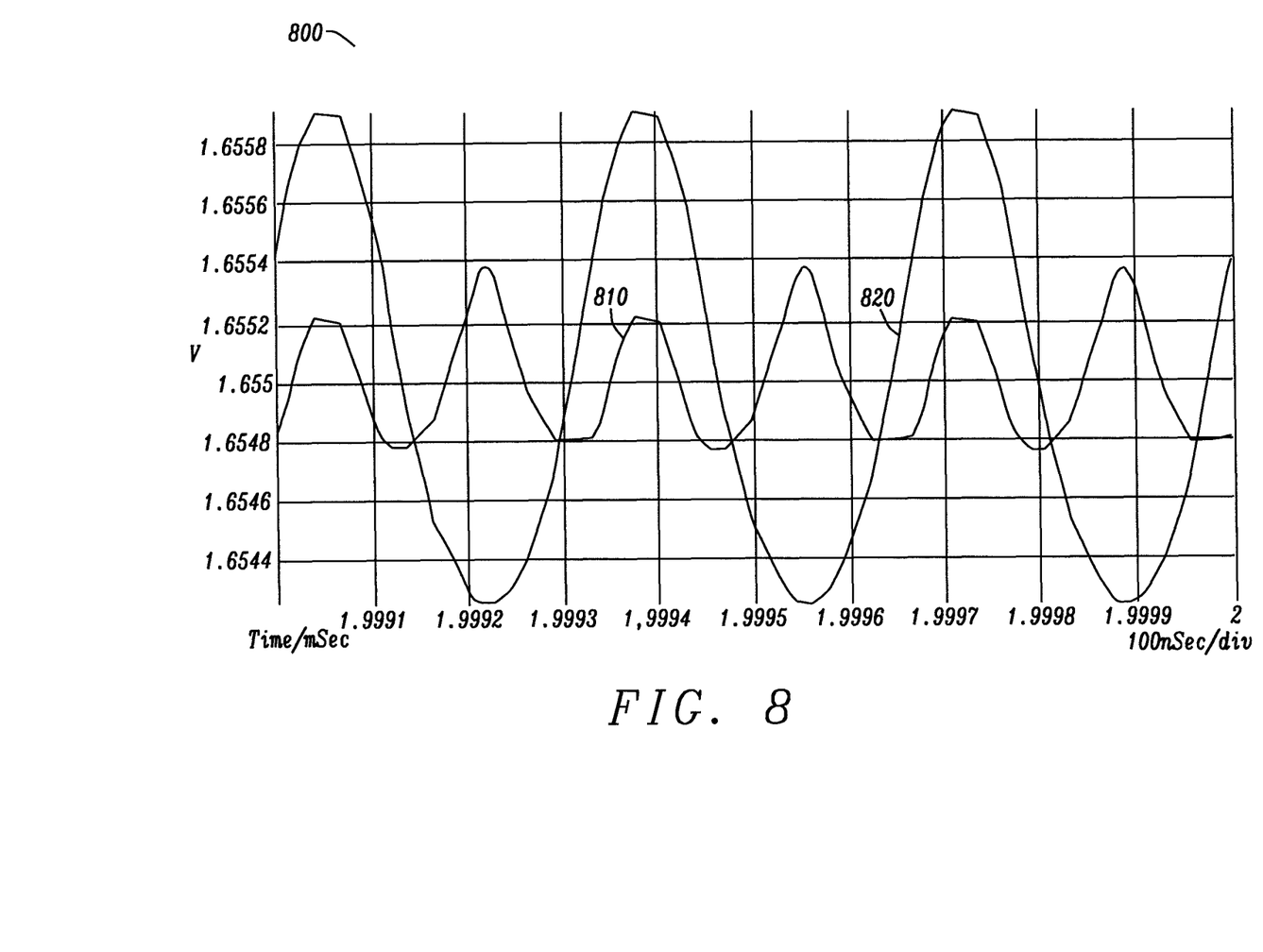
FIG. 8 illustrates the output voltage ripple comparison of a 3-phase DC-DC switching converter with asymmetric inductors, and different phase-shifting configurations, compared to the prior art.

FIG. 8 illustrates output voltage ripple comparison 800 of a 3-phase DC-DC switching converter with asymmetric inductors (L1=0.47 uH, L2=L3=0.22 uH), and different phase-shifting configurations, compared to the prior art. The output voltage ripple simulation shows an ideal condition of a 3-phase switching converter at 33% duty cycle (VIN=5V), with inductor L1 on phase 1 0.47 uH, and inductors L2 and L3 on phase 2 and phase 3 0.22 uH. It shows that 120 deg between phases 820 is not the optimum phase-shifting configuration for a 3-phase switching converter with asymmetric inductors. Applying the principles of the disclosure is shown to be effective in minimizing the magnitude of the output voltage ripple 810.

Figure 9:
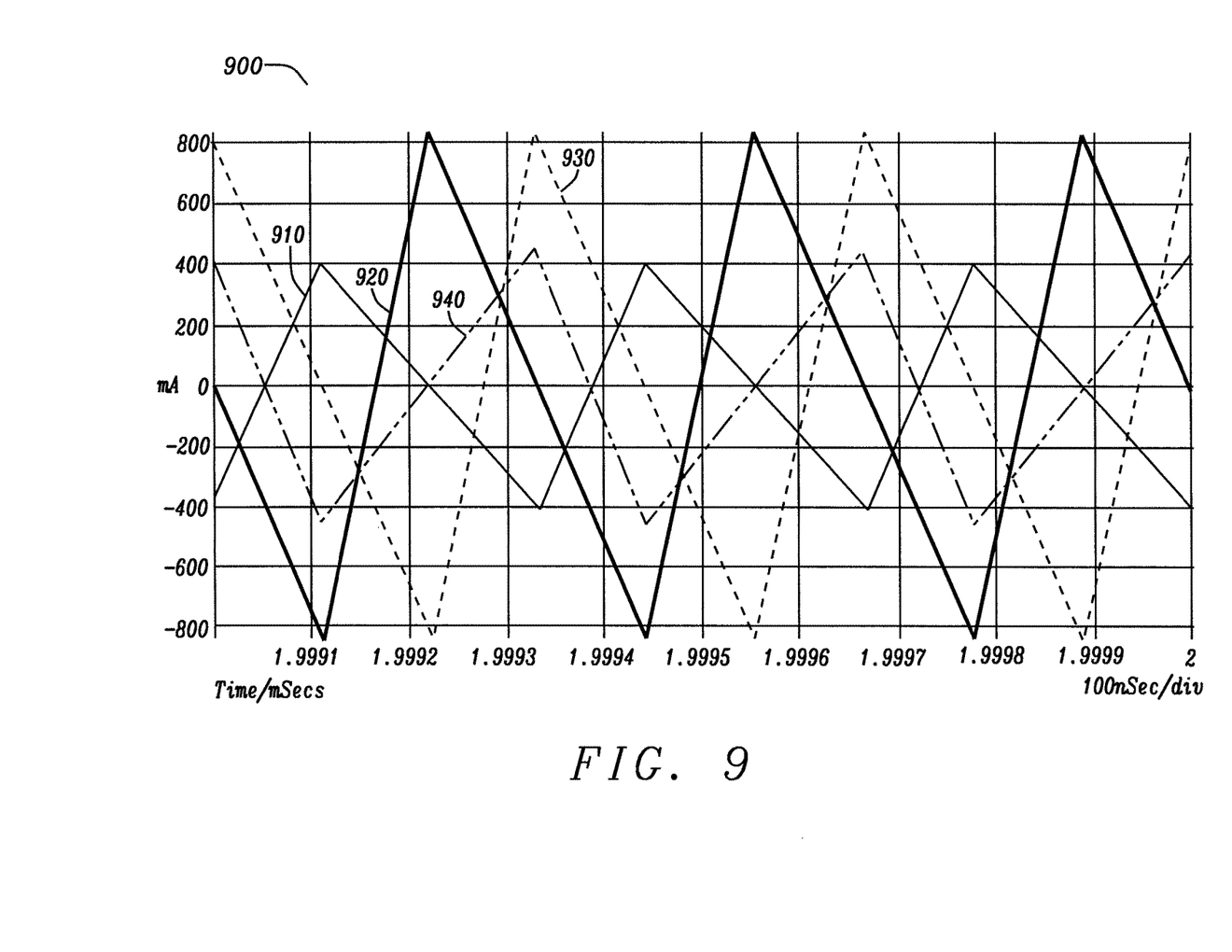
FIG. 9 shows inductor and output capacitor current ripple, with 120 degrees between phases, of the prior art.

FIG. 9 shows inductor and output capacitor current ripple 900 with 120 degrees between phases, of the prior art. Phase-1 inductor current is 910, phase-2 inductor current is 920, phase-3 inductor current is 930, and output capacitor current is 940. The output capacitor current ripple is not reduced with the phase-shifting configuration of 120 degs between phases.

Figure 10:
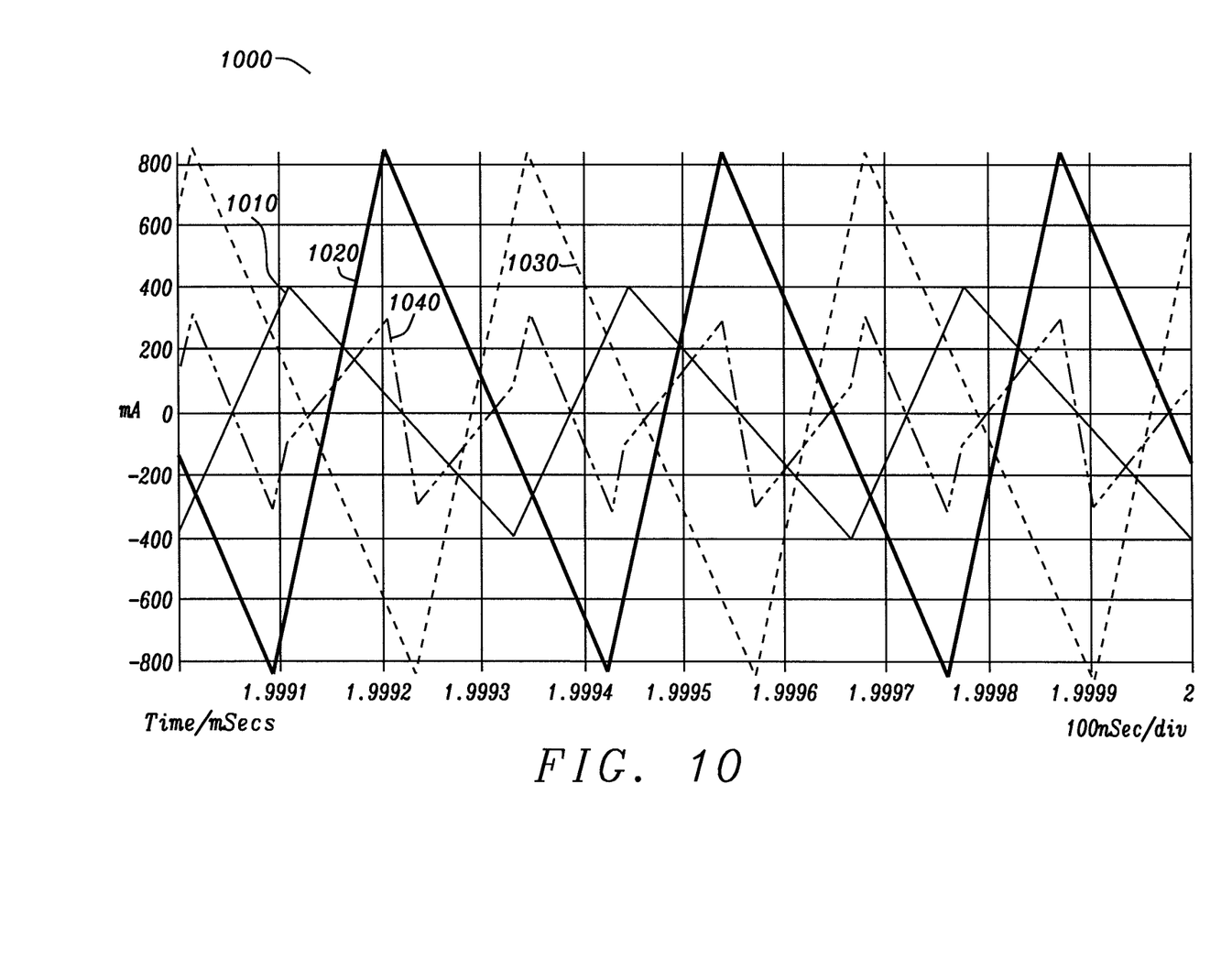
FIG. 10 illustrates inductor and output capacitor current ripple, with 0 deg/102.8 deg/257.2 deg phase-shifting configuration, embodying the principles of the disclosure.

FIG. 10 illustrates inductor current ripple and output capacitor current 1000, with 0 deg/102.8 deg/257.2 deg phase-shifting configuration, embodying the principles of the disclosure. Phase-1 inductor current is 1010, phase-2 inductor current is 1020, phase-3 inductor current is 1030, and output capacitor current is 1040. The output capacitor current ripple is inversely proportional to the inductance value and is minimized with the phase-shifting configuration of the present disclosure.

Figure 11:
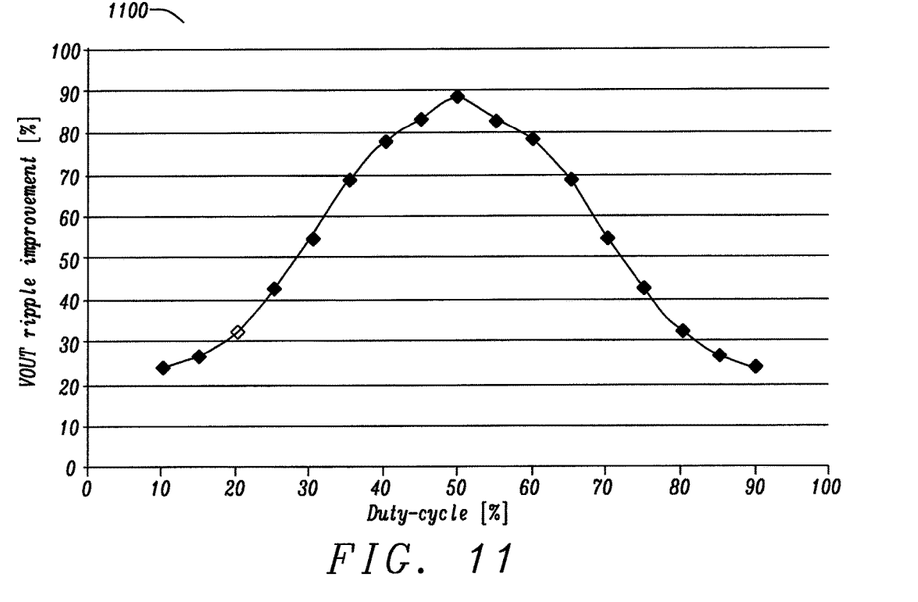
FIG. 11 shows output voltage ripple improvement vs duty-cycle, in a 3-phase DC-DC switching converter with asymmetric inductors, embodying the principles of the disclosure.

FIG. 11 shows output voltage ripple improvement 1100 vs duty-cycle, in a 3-phase DC-DC switching converter with asymmetric inductors, embodying the principles of the disclosure. The theoretical calculation result of output voltage ripple improvement of the proposed scheme with 0 deg/102.8 deg/257.2 deg phase-shifting configuration is shown. Inductor values of L1=0.47 uH, L2=0.22 uH, and L3=0.22 uH are used, and the output voltage ripple improvement is shown to be dependent on the duty-cycle.

Figure 12:
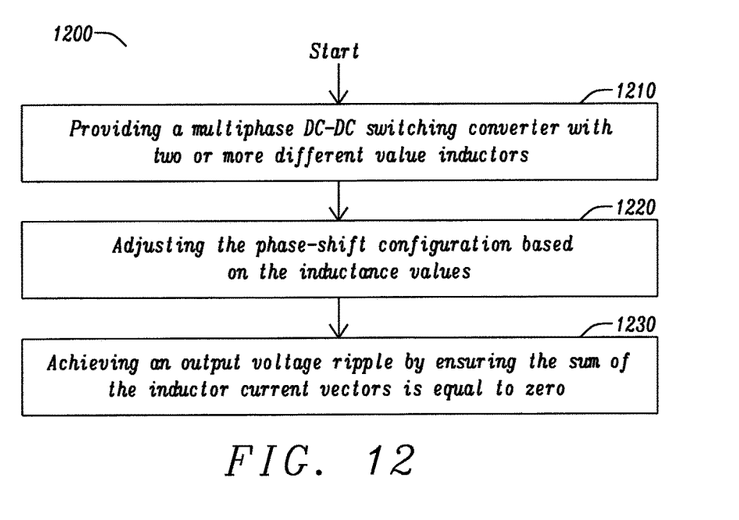
FIG. 12 shows a flowchart of a method to minimize the magnitude of the output voltage ripple, in multiphase DC-DC switching converters with asymmetric inductors, embodying the principles of the disclosure.

FIG. 12 shows flowchart 1200 of a method to minimize the magnitude of the output voltage ripple in multiphase DC-DC converters with asymmetric inductors, embodying the principles of the disclosure. Step 1210 shows providing a multiphase DC-DC switching converter with two or more different value inductors. Step 1220 shows adjusting the phase-shift based on the inductance values. Step 1230 shows achieving the smallest output voltage ripple by ensuring the sum of the inductor current vectors is equal to zero.

The advantages of one or more embodiments of the present disclosure include increasing the AC accuracy of the output voltage and the efficiency of a DC-DC switching converter. The proposal allows for the minimization of peak-to-peak output voltage ripple in a multi-phase DC-DC switching converter, with two or more different value inductors, by the optimization of phase-shifting determined by the inductance on each phase, and not by the number of phases.

While this invention has been particularly shown and described with reference to the preferred embodiments thereof, it will be understood by those skilled in the art that various changes in form and details may be made without departing from the spirit and scope of the invention.

The invention claimed is:

1. A multiphase DC-DC switching converter, comprising:
   n phases, with a pair of power switches on each phase, where n is two or more;
   n asymmetric inductors, each of said asymmetric inductors connected to one of said pairs of power switches;
   a single output, connected in parallel to each of said asymmetric inductors;
   an error amplifier having as inputs said single output and a reference voltage;
   n comparators configured to compare an output of said error amplifier and n ramp generator output signals, resulting in n pulse width modulation (PWM) signals, configured to be used as input signals to said pairs of power switches; and
   a clock generator, configured to generate n phase-shifted clock signals for said ramp generator output signals,
   wherein a phase-shift configuration is determined by said asymmetric inductors of said phases and said phase-shifted clock signals.

2. The multiphase DC-DC switching converter of claim 1, wherein said switching converter is a Buck, Boost, or Buck-Boost DC-DC switching converter.

3. The multiphase DC-DC switching converter of claim 1, wherein said one or more of said n asymmetric inductors comprise an inductor value that differs from others of said asymmetric inductors.

4. The multiphase DC-DC switching converter of claim 1, wherein a peak-to-peak output voltage ripple is determined by said phase-shift configuration.

5. The multiphase DC-DC switching converter of claim 4, wherein said peak-to-peak output voltage ripple is determined by a sum of inductor current vectors.

6. The multiphase DC-DC switching converter of claim 5, wherein said output voltage ripple is minimized by said sum of inductor current vectors being equal to zero.

7. The multiphase DC-DC switching converter of claim 1, wherein said clock is a synchronous logic circuit.

8. The multiphase DC-DC switching converter of claim 7, wherein said synchronous logic circuit comprises a clock generator set at a frequency higher than a DC-DC switching converter switching frequency.

9. The multiphase DC-DC switching converter of claim 1, wherein said clock generator comprises a clock divider and delay lines.

10. The multiphase DC-DC switching converter of claim 9, wherein a length of said delay line is based on a determined amount of phase-shifting.

11. The multiphase DC-DC switching converter of claim 1, wherein said clock generator comprises a ring oscillator with variable delays.

12. The multiphase DC-DC switching converter of claim 11, wherein said variable delays are based on a determined amount of phase-shifting.

13. The multiphase DC-DC switching converter of claim 1, wherein said clock generator comprises a delay-locked loop (DLL).

14. The multiphase DC-DC switching converter of claim 13, wherein a delay is based on a determined amount of phase-shifting.

15. A method for phase shift optimization using asymmetric inductors, comprising:
   providing a multiphase DC-DC switching converter, with two or more phases, each of said phases having a pair of power switches;

providing two or more asymmetric inductors, each of said asymmetric inductors connected to one of said pairs of power switches;

providing a single output, connected in parallel to each of said asymmetric inductors; and determining a phase shift configuration with said asymmetric inductors of said phases and phase-shifted clock signals.

16. The method of claim 15, wherein said phase shift configuration determines a peak-to-peak output voltage ripple.

* * * * *